Dec. 6, 1927.
J. ST. C. WERNIG
1,651,792
IMPACT BAR FOR AUTOMOBILE BUMPERS
Filed Feb. 18, 1926
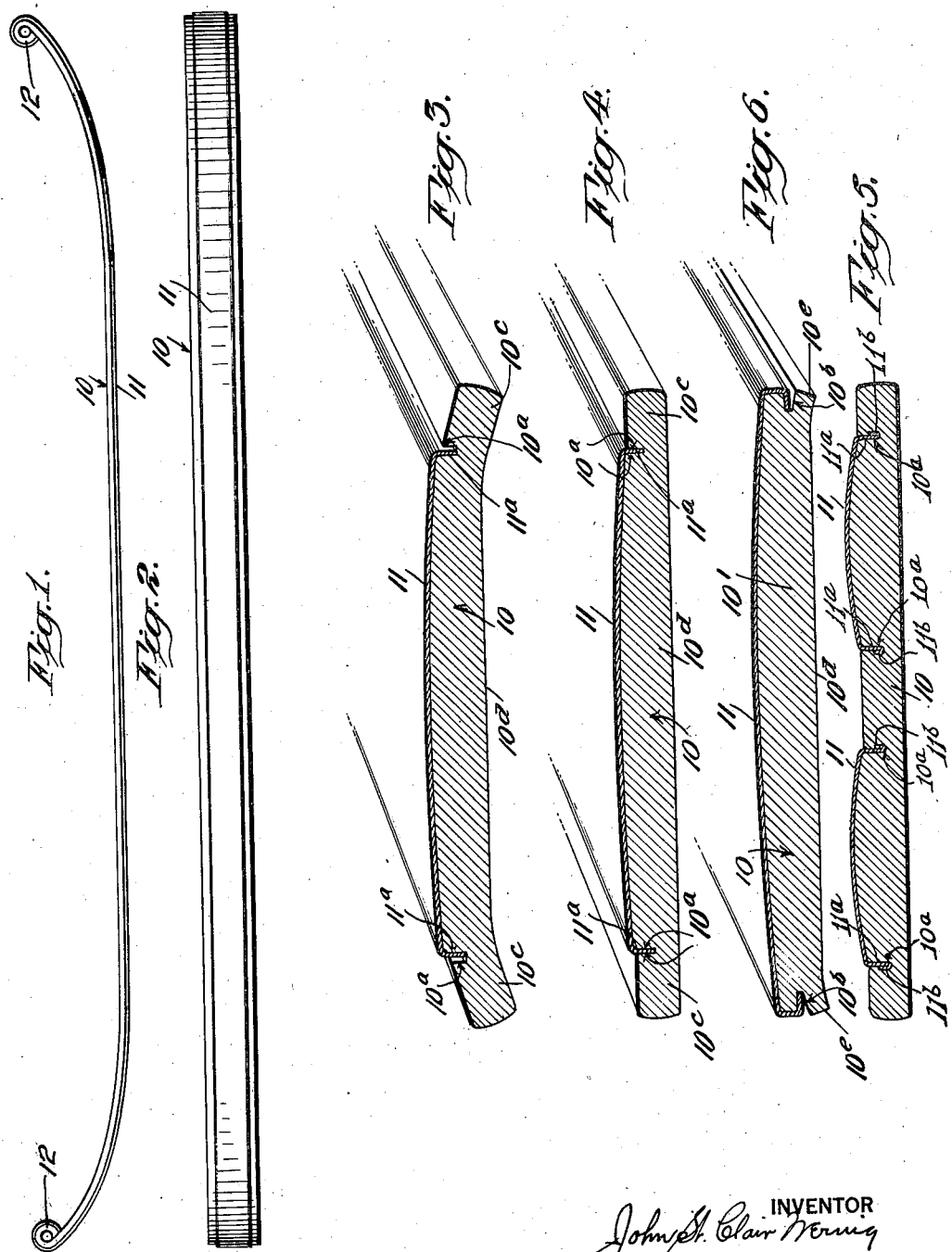

Patented Dec. 6, 1927.

1,651,792

UNITED STATES PATENT OFFICE.

JOHN ST. CLAIR WERNIG, OF BROOKLYN, NEW YORK, ASSIGNOR OF ONE-FOURTH TO JOSEPH F. O'BRIEN, OF ENGLEWOOD, NEW JERSEY.

IMPACT BAR FOR AUTOMOBILE BUMPERS.

Application filed February 18, 1926. Serial No. 89,031.

This invention relates to improvements in impact bars for automobile bumpers.

One of the objects of this invention is to produce an impact member for automobile bumpers which will have an enhanced ornamental appearance.

Another object of the invention is to produce an impact member for automobile bumpers comprising a composite bar composed of a bar portion of spring steel and an ornamental strip preferably composed of a metal having a polished surface of contrasting color, in which the strip will be permanently and securely fastened to one face of said bar along the entire length thereof without the use of rivets, screws or like fastening devices.

Another object of the invention is to provide a composite bar for bumper impact members, preferably comprising a thin strip of a malleable metal having a polished surface which is practically untarnishable, such as a non-tarnishing, stainless iron or steel, and to utilize the inherent malleable qualities of the steel bar and of the iron strip to provide an integral connection therebetween and to enable the fastening and tight retention of the strip on the bar without the use of rivets, bolts or like fastening devices which would mar the appearance of the bar.

Another object of the invention is to produce an ornamental composite bar for use as an impact member of an automobile bumper in which the connection between the two parts of the bar may be made during the process of rolling the bar.

Another object of the invention is to produce a composite impact bar composed of a bar of resilient metal and an ornamental strip secured to one face thereof in which the connection between the bar and strip is along the opposite longitudinal edges of the strip and said connection may be accomplished by an interengaging connection between integral portions of the members.

Another object of the invention is to provide a method whereby the ornamental strip of a composite bar for impact members of automobile bumpers may be attached during the process of rolling the bar and comprises the depression in the bar of grooves or slits, the superimposition of an ornamental strip on said bar with its opposite longitudinal edges inserted within said grooves or slits and the closing or bringing together of the walls of said grooves to fasten the edges of the strip in place on the bar.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a plan view of a composite impact member or automobile bumper made in accordance with my invention;

Fig. 2 is a plan view of the composite impact bar shown in Fig. 1;

Fig. 3 is a cross section of one composite bar showing the formation in the bar of grooves and the insertion of the opposite edges of the ornamental strip in such grooves prior to the fastening thereof;

Fig. 4 illustrates another section similar to Fig. 3, in which portions of the metal of the bar at the sides of each of the grooves has been rolled to close such grooves on the longitudinal edges of the strip to fasten the same to the bar;

Fig. 5 is a similar sectional view of a bar of extended area in which two ornamental strips are fastened on the face of the bar by my integral interengaging connection; and Fig. 6 is a similar transverse section of another modified form of bar made in accordance with my invention.

Referring now to Figs. 1 to 4 of these drawings which illustrate a preferred embodiment of my invention, 10 indicates one form of a composite impact bar for automobile bumpers made in accordance with my invention and preferably comprises a spring steel bar of suitable thickness provided on the front face thereof with a thin ornamental metal strip 11 which is preferably a highly polished strip and is colored in contrast with the bar portions on opposite sides thereof to produce an ornamental effect.

By my invention, the malleability of the metal of the spring steel bar and also of the strip is taken advantage of to provide an integral connection between them which will be permanent and tight without the use of rivets, screws or other fastening devices. As illustrated, a thin ornamental strip of metal 11 is connected along the longitudinal edge portions 11ª thereof to the bar 10 and is securely held in place on said bar at all points by such an integral connection. This integral connection is preferably formed by rolling or otherwise forming in the main bar adjacent to the opposite longitudinal edges thereof, a pair of longitudinal grooves 10ª, superimposing an ornamental strip on the face of said main bar between such grooves with the marginal edges of the strip inserted within said grooves, and then folding preferably by rolling the metal of the bar over said edges of the strip to fasten the said longitudinal edges to the main bar and thus to provide an integral connection or joint between the said main bar and the ornamental strip. As illustrated, the marginal longitudinal edges of the ornamental strip are bent as shown at 11ª to form a marginal flange projecting at an angle from the strip and the edge of the opposite wall of the groove 10ª is rolled over said bent edge to lock the same in place and provide an interengaging integral connection.

In the preferred form of my invention, the ornamental strip will be composed of a thin strip of non-tarnishing and stainless iron which is malleable, and the longitudinal edges of this strip will be provided with the said bent flange portion which will be caused to interengage with the walls 10ª, 10ᵇ of the groove upon the rolling or other bending of the metal of the bar to close the groove.

It will be understood that in bars of this type the use of rivets or other fastening devices which pass through the ornamental strip not only mar the ornamental effect of the mounting of said strip but provide cracks and joints which gather dirt, permit entrance of moisture to cause corrosion and thus detract from and mar the appearance and durability of the bar; that by the use of applicant's invention, the attachment of the strip to the bar by such rivets is entirely eliminated; also that the connection extends the entire length of the bar and is permanent and secure; and, furthermore, that this attachment may be accomplished by a process of rolling of the metal of the bar.

In the preferred embodiment of my invention shown, the portion of the bar on which the strip is mounted is preferably provided with a transversely-disposed arcuate surface so that when the edges of the strip are inserted, and the grooves in the main bar are closed to secure the edges of the ornamental strip, this strip will be tightened and pressed firmly against this bowed, convex or arcuate surface and thus will result in a tightening or hugging by the strip on this surface at all points along the bar so as to avoid buckling or blistering and, furthermore, that the edges of the strip and its connection or joint will be below the surface of the main bar so as to be completely concealed from view and also that if the bar and strip are so connected in heated condition, the joint between the two members will be extremely tight and will be, in effect, an amalgamation of the two metals to produce a sealed and weather-tight joint.

In Fig. 5, I have illustrated a modified form of my invention in which two ornamental strips are fastened on the face of the bar 10 in a manner similar to that hereinabove described in regard to the single strip, the only differences being that four grooves 10ª are formed in the face of the bar instead of two and all four are closed at the same time to lock in two strips instead of one, and the edges of the strips 11 are turned back to form beads 11ᵇ.

In Fig. 6, I have shown another modified form of my invention in which grooves 10ᵇ are formed in the longitudinal edges of the spring steel bar 10ᵈ and that portion of the ornamental strip 11' adjacent to the edge is bent around the edge of the said bar 10' and the marginal edge of the said strip is provided at its marginal edge with a downwardly-extending portion and an inwardly extending flange adapted to fit within a groove 10ᵇ so that when the opposite wall of said groove is rolled to close the same, the strip will be locked in place.

It will be seen from examination of Fig. 3 and also from Fig. 6 that the bars are initially rolled with the grooves and in such rolling that two longitudinal marginal strips at the outside of the grooves and extending from the longitudinal grooves to the edges of the bar are bent downwardly to slightly incline from the bottom surface of the bar so that by a subsequent rolling or pressing operation on the bottom surface of the bar, this strip will be moved upwardly into the plane of the central part of the bar, the bottom surface will be flattened out and the grooves will be closed against the longitudinal marginal edges of the ornamental strip to confine and secure the same in place. As illustrated in Fig. 3, the marginal strips 10ᶜ are thus turned downwardly from the central portion 10ᵈ, while in Fig. 6, the ends 10ᵉ are likewise turned downwardly from the central portion 10ª.

In the preferred embodiment of my invention hereinabove referred to, in which a strip of stainless iron is utilized in combination with a bar of spring steel, it will be seen that the process of making or preparing the ornamental bar may be carried out at the steel plant. Thus, the grooves may be rolled in the bar 10 which subsequently after tempering, becomes the spring steel bar of the bumper, the ornamental strip 11 of such stainless or non-tarnishing iron, may be bent or superimposed upon the bar 10 by rolling or pressing operation, after which, the ornamental bars thus formed are cut in suitable lengths and shipped to the bumper manufacturer. In the plant of the bumper manufacturer, these ornamental bars are first formed into whatever shape may be necessary for the particular bumper to be manufactured as, for example, the bars may be bowed as shown in Fig. 1 and the eyes 12, 12 formed at the ends thereof, and thereafter, ornamental bars as a unit may be heat-treated or tempered to bring out the proper resilience or spring qualities or characteristics.

It will be seen, furthermore, that when the strip 11 is made of the preferred metal, namely, stainless iron, the bar may be formed into suitable shape and may be heat-treated at the bumper-manufacturing plant without causing the polished metal surface of the strip to blister, or to become so stained as to require regrinding or otherwise to be permanently affected or made non-adaptable for the purpose intended. The use of this metal for the strip will also permit a better bonding or connection between the marginal edges of the strip and the bar of spring steel than can be obtained by the use of other metals and, furthermore, will eliminate the necessity of the expensive nickle plating operations usually employed in making ornamental bumper bars, as the polished surface of said strip of stainless or non-tarnishing iron will last indefinitely and if any discoloration appears because of weather condition, the same may be easily removed by hand rubbing with a piece of cloth.

Having described my invention, I claim:—

1. An impact bar for automobile bumpers comprising a composite bar formed of a main bar and an ornamental strip member superimposed upon said main bar, said bar member having on its front face a groove and a strip member being provided with a marginal edge fitting within said groove and frictionally engaged by the opposite walls thereof to lock the composite members of the bar together.

2. An impact bar for automobile bumpers comprising a composite bar formed of a main bar provided with grooves in its surface and an ornamental facing strip provided with flanges fitting within said grooves and connected to the said main bar by a closing of such grooves.

3. An impact bar for automobile bumpers comprising a composite bar formed of a main bar and an ornamental strip member superimposed upon said main bar, said member having a bend at each of its longitudinal edges and the main bar having means for engaging said bent portions to lock the members of the bar together.

4. A composite bar for impact members of automobile bumpers composed of a bar of raw steel suitable, upon tempering, to produce a spring steel bumper bar and a strip of stainless iron permanently fastened to said raw steel bar.

5. A composite bar for impact members of automobile bumpers composed of a bar of raw steel suitable, upon tempering, to produce a spring steel bumper bar and a strip of stainless iron permanently connected to the said raw bar by an integral joint.

6. A composite bar for impact members of automobile bumpers composed of a bar of raw steel suitable, upon tempering to produce a spring steel bumper bar and a strip of stainless iron permanently connected at its opposite longitudinal edges to the said raw bar by an integral joint.

7. A composite bar for impact members of automobile bumpers composed of a bar of raw steel suitable upon tempering, to produce a spring steel bumper bar and an ornamental strip connected at its opposite longitudinal edges to the said raw bar by an integral joint, said joint being formed while one of the members is hot to produce a bond between the metal of the bar and strip.

8. The process of producing ornamental bars for automobile bumpers comprising the manufacture of a bar of metal having grooves, the superimposition on said bar of an ornamental strip having its edges inserted in said grooves and the closing of said grooves to confine the edges of the ornamental strip therein.

9. The process of producing ornamental bars for automobile bumpers comprising the manufacture of a bar of metal having grooves, the superimposition on said bar of an ornamental strip having its edges inserted in said grooves, the heating of one of said members and the closing of said grooves to confine the edges of the ornamental strip therein to produce a bond between such members.

10. The process of producing ornamental bars for automobile bumpers comprising the manufacture of a bar, the provision in said bar of longitudinal grooves at opposite sides of the longitudinal median line thereof and longitudinally-extending strips arranged at one side of said grooves and bent downwardly in relation to the plane of the horizontal axis of the bar, the superimposition of an ornamental strip upon said bar having its longitudinal edges inserted within said grooves, and the bending of said horizontal strips to close the grooves and confine the ornamental strips therein.

11. The process of producing ornamental bars for automobile bumpers comprising the drawing of a bar, the provision in said bar of grooves at the longitudinal side edges thereof and a longitudinal strip adjacent to said grooves bent downwardly in relation to the plane of the horizontal axis of the bar, the superimposition of an ornamental strip upon said bar having its longitudinal edges inserted within said grooves, the heating of one of said members, the bending of said horizontal strips while said member is heated to close the grooves, confine the edges of the ornamental strip therein and to form a hot bond between the edges of said strip and said bar.

12. An impact bar for automobile bumpers comprising a composite bar formed of a main bar and an ornamental strip mounted upon and connected at its opposite longitudinal edges to said main bar by means of a connection concealing the said edges of the strip.

13. An impact bar for automobile bumpers comprising a composite bar formed of a main bar member and an ornamental strip member mounted upon said main bar, said members having a sealed joint between the longitudinal edges of said strip and said bar.

14. An impact bar for automobile bumpers comprising a composite bar formed of a main bar member and an ornamental strip member mounted upon said main bar, said members having an autogenous joint formed between the said longitudinal edges of said strip and said bar.

15. An impact bar for automobile bumpers comprising a composite bar formed of a main bar member having a top surface arcuate in cross section, an ornamental strip member superimposed upon said arcuate portion and having its longitudinal edges fastened to said bar at opposite sides of said arcuate portion by a groove connection having walls abutting against opposite faces of said strip and concealing the edges of the strip.

16. An impact bar for automobile bumpers comprising a composite bar formed of a main bar member, an ornamental strip member superimposed upon and having its longitudinal edges fastened to said bar at opposite sides thereof, said main bar member being provided with means for continuously engaging opposite faces of said edge portions to fasten said longitudinal side edges of said strip.

17. An impact bar for automobile bumpers comprising a composite bar formed of a main bar member having a top surface arcuate in cross section, an ornamental strip member superimposed upon said arcuate portion and having its longitudinal edges fastened to said bar at opposite sides of said arcuate portion, said members having an autogenous joint formed between the said longitudinal edges of said strip and said bar.

In witness whereof, I have signed my name to the foregoing specification.

JOHN ST. CLAIR WERNIG.